United States Patent
Garoff et al.

(10) Patent No.: US 12,234,577 B2
(45) Date of Patent: Feb. 25, 2025

(54) PROCESS FOR THE MANUFACTURE OF A PRECURSOR YARN

(71) Applicant: Stora Enso OYJ, Helsinki (FI)

(72) Inventors: Niklas Garoff, Skarholmen (SE); Robert Protz, Potsdam (DE); Jens Erdmann, Berlin (DE); Johannes Ganster, Potsdam (DE); Andre Lehmann, Potsdam (DE)

(73) Assignee: Stora Enso OYJ, Helsinki (FI)

( * ) Notice: Subject to any disclaimer, the term of this patent is extended or adjusted under 35 U.S.C. 154(b) by 1237 days.

(21) Appl. No.: 15/766,457

(22) PCT Filed: Oct. 6, 2016

(86) PCT No.: PCT/IB2016/055986
§ 371 (c)(1),
(2) Date: Apr. 6, 2018

(87) PCT Pub. No.: WO2017/060845
PCT Pub. Date: Apr. 13, 2017

(65) Prior Publication Data
US 2019/0085484 A1    Mar. 21, 2019

(30) Foreign Application Priority Data

Oct. 8, 2015 (SE) .................... 1551297-3

(51) Int. Cl.
*D01F 11/02* (2006.01)
*C08L 1/02* (2006.01)
(Continued)

(52) U.S. Cl.
CPC ............... *D01F 11/02* (2013.01); *C08L 1/02* (2013.01); *C08L 97/005* (2013.01); *D01F 2/00* (2013.01);
(Continued)

(58) Field of Classification Search
CPC ... D01F 11/02; D01F 2/00; D01F 9/17; D01F 9/22; D01F 11/00; D01F 9/00; D01F 9/16;
(Continued)

(56) References Cited

U.S. PATENT DOCUMENTS 4,284,615 A    8/1981    Maruyama
2003/0024052 A1*    2/2003    Azuse .............. D06M 13/463
8/115.51

(Continued)

FOREIGN PATENT DOCUMENTS

CN    101586257 A    11/2009
CN    104596906    5/2015
(Continued)

OTHER PUBLICATIONS

Plaisantin, H. et al. "Ex-cellulose carbon fibres with improved mechanical properties", Journal of Material Sciences, 2006, vol. 41, pp. 1959-1964.

(Continued)

*Primary Examiner* — Camie S Thompson
(74) *Attorney, Agent, or Firm* — Greer, Burns & Crain, Ltd.

(57) ABSTRACT

The present invention relates to a method for manufacturing precursor yarn comprising lignin, which may be further processed into intermediate carbon fibers and finally also carbon fibers. It also relates to carbon fibers and uses of said fibers. Said method involves applying a water-free spin finish.

27 Claims, 1 Drawing Sheet

(51) Int. Cl.
  *C08L 97/00* (2006.01)
  *D01F 2/00* (2006.01)
  *D01F 9/00* (2006.01)
  *D01F 9/16* (2006.01)
  *D01F 9/17* (2006.01)
  *D01F 9/22* (2006.01)
  *D01F 11/00* (2006.01)
  *D06M 13/127* (2006.01)
  *D06M 13/144* (2006.01)
  *D06M 13/224* (2006.01)
  *D06M 13/35* (2006.01)

(52) U.S. Cl.
  CPC .................. *D01F 9/00* (2013.01); *D01F 9/16* (2013.01); *D01F 9/17* (2013.01); *D01F 11/00* (2013.01); *D06M 13/127* (2013.01); *D06M 13/144* (2013.01); *D06M 13/224* (2013.01); *D06M 13/35* (2013.01); *D01F 9/22* (2013.01)

(58) Field of Classification Search
  CPC ...... C08L 97/005; C08L 1/02; D06M 13/127; D06M 13/144; D06M 3/224; D06M 13/35; D06M 13/224
  USPC ........................................... 428/364; 530/502
  See application file for complete search history.

(56) References Cited

U.S. PATENT DOCUMENTS

| | | | | |
|---|---|---|---|---|
| 2008/0118427 | A1* | 5/2008 | Leon y Leon | D01F 9/12 423/447.2 |
| 2009/0263576 | A1* | 10/2009 | Okabe | D06M 7/00 427/228 |
| 2010/0285223 | A1 | 11/2010 | Park et al. | |
| 2012/0295504 | A1* | 11/2012 | Miyauchi | B29C 70/46 442/179 |
| 2012/0319315 | A1 | 12/2012 | Cho et al. | |
| 2014/0353861 | A1 | 12/2014 | Sjoholm et al. | |
| 2015/0037241 | A1* | 2/2015 | Lehmann | B29D 99/0078 423/447.9 |
| 2016/0168761 | A1* | 6/2016 | Okuda | C01B 32/00 428/367 |

FOREIGN PATENT DOCUMENTS

| | | |
|---|---|---|
| DE | 102012006501 A1 | 10/2013 |
| EP | 0297702 A2 | 1/1989 |
| JP | 2012154000 A | 8/2012 |
| KR | 20130078788 A | 7/2013 |
| KR | 20140002991 | 1/2014 |
| KR | 20140002991 A | 1/2014 |
| RU | 2045472 | 10/1995 |
| TW | 201335452 A | 9/2013 |
| WO | 2012138802 A1 | 10/2012 |
| WO | 2012156443 | 11/2012 |
| WO | WO-2012156441 A1 * | 11/2012 ......... B29D 99/0078 |
| WO | WO-2015016199 A1 * | 2/2015 ............... D01F 9/14 |

OTHER PUBLICATIONS

Schreiber, M. et al. "Iodine Treatment of Lignin-Cellulose Acetate Electrospun Fibers: Enhancement of Green Fiber Carbonization", ACS Sustainable Chemistry Engineering, 2015, vol. 3, pp. 33-41.
Ma, Y. et al. "High-Strength Composite Fibers from Cellulose-Lignin Blends Regenerated from Ionic Liquid Solution" ChemSusChem, 2015, vol. 8, pp. 4030-4039.
International Search Report for PCT/IB2016/055986, Jan. 19, 2017.
U.S. Appl. No. 15/766,470 entitled "A Process for the Manufacture of a Shaped Body", Inventor: Garoff, Niklas et al., filed Apr. 6, 2018.
Taiwanese Office Action for application No. 105132611, dated May 14, 2020.

* cited by examiner

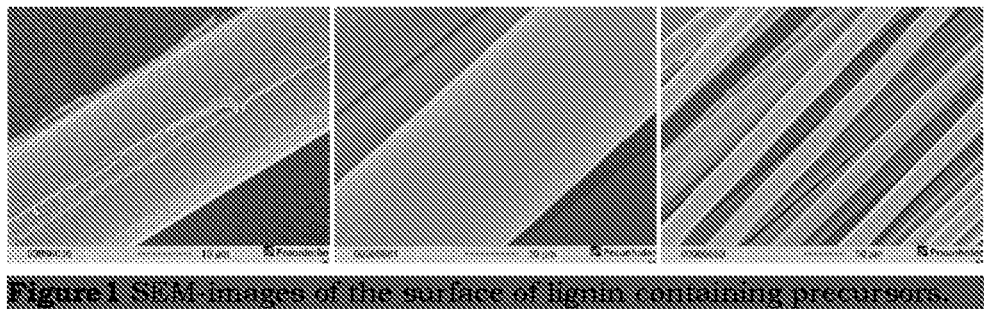
Figure 1 SEM images of the surface of lignin-containing precursors

PROCESS FOR THE MANUFACTURE OF A PRECURSOR YARN

This application is a U.S. National Stage under 35 U.S.C. § 371 of International Application No. PCT/IB2016/055986, filed Oct. 6, 2016, which claims priority to Swedish Patent Application No. 1551297-3, filed Oct. 8, 2015.

FIELD OF INVENTION

The present invention relates to a method for manufacturing precursor yarn comprising lignin, which may be further processed into intermediate carbon fibers and finally also carbon fibers. Carbon fibers and also uses of said fibers are also disclosed. Said method involves applying a water-free spin finish. Said method is preferably a solution spinning process which then may be used for the continuous manufacture of lignin containing endless filament precursor yarns.

BACKGROUND

Lignin is a polyaromatic polyol and constitutes, after cellulose, the second largest material component in wood and other lignocellulosic plants. During chemical pulping cellulosic fibers are separated from softwoods, hardwoods, and annual plant biomass, for further processing to paper, board and tissue products. Kraft pulping is the dominant chemical pulping process. Other processes include soda pulping, sulfite pulping and the organosolv process. In alkaline pulping (i.e. Kraft and soda pulping), large quantities of lignin become dissolved in the alkaline pulping liquor, known as black liquor, a highly alkaline complex mixture containing used cooking chemicals, solubilized wood lignin, carbohydrates and organic acids. From there the lignin can be further processed to energy by combustion of the partly evaporated black liquor or, alternatively, be isolated in solid form by addition of acid. The amount of carbon in lignin is approx. 60-65%. The chemical structure of precipitated lignin is determined by the type of biomass used and the pulping method.

Compared to the traditional raw materials for making fibers, lignin is more cost-competitive. However, in practice, it is not a fiber-forming material in its unmodified form. Regarding the conversion of lignin to a fiber most attempts described in the literature refer to melt-spinning of lignin to filament. J. F. Kadla et al. [1] describe the production of lignin fiber by melt-spinning of a commercially available Kraft lignin and also melt-spinning of a mixture of lignin with low proportions up to 5% of polyethylene oxide (PEO). Processing of pure lignin requires a thermal pre-treatment which increases the raw material costs and, in mixtures, only small proportions of PEO are possible since, with larger quantities of PEO, filament stickiness occurs in the stabilizing process. The carbon fibers made from the melt-spun lignin-containing precursors had strengths of approx. 0.4 GPa and moduli in the range 40-50 GPa, i.e. far below the values of commercial carbon fiber and even lower than the values of glass fiber.

Kubo et al. [2] describe a process for the melt-spinning of lignin, in which, in a pre-treatment step, the non-melting high-molecular components are removed from the lignin. In a further publication, K. Sudo et al. [3] describe the pre-treatment of lignin with organic solvents with subsequent melt-spinning of the chloroform-soluble fraction. The carbon fibers produced therefrom had merely a low strength level.

DE 2118488 describes a method for melt spinning a lignin derivative to lignin fiber. U.S. Pat. No. 7,678,358 claims acetylation of lignin as precursor of lignin melt-spinning without however giving any information relating to the properties of the carbon fibers produced in this way.

It has been shown previously that it is possible in principle to produce melt-spun lignin-containing filaments for subsequent conversion to carbonized fibers. However, a disadvantage with melt-spun lignin fibers is their low strength and brittleness. Strength levels of merely 30 to 35 MPa at 0.5 to 1% elongations at break are reported [4]. Lignin fibers cannot withstand the mechanical stresses during continuous production caused by fiber transportation (via rollers), stretching and winding/unwinding. These low strength levels make it for example challenging to convert the lignin precursor to carbon fiber in an industrial continuous manufacturing process which decreases the attractiveness of lignin-based precursor fibers for the production of carbon fiber. The low strength levels can be explained by the lack of a strong linear polymer backbone in the chemical structure of the lignin macromolecule.

Solution-based spinning processes of lignin-containing fibers also comprise a fiber-forming polymer in the raw material composition, which gives higher fiber strength. WO 2012003070 describes a method for the manufacture of dopes containing PAN and lignin for the production of carbon fiber precursors via solvent spinning. PCT2012EP59114 describes a method for manufacturing filaments from dopes of PAN and lignin and dopes of cellulose or cellulose derivatives and lignin, respectively, via air-gap spinning. In U.S. Pat. No. 3,461,082 methods are disclosed for dry spinning lignin to fibers. Furthermore, methods are disclosed for wet-spinning hybrid fibers from lignin dissolved in sodium hydroxide and cellulose dissolved in carbon disulfide. In addition, U.S. Pat. No. 3,461,082 describes a method for wet-spinning hybrid fibers comprised of lignin and polyacrylic nitrile dissolved in dimethyl sulfoxide. Solution-based spinning processes are based on dissolving the raw materials in a solvent to form the so called dope. After spinning, i.e. transfiguration of the dope to a filament yarn, the substrate is passed into a precipitation bath containing an anti-solvent, in which the yarn is allowed to solidify through a diffusion-controlled process. The solvent diffuses from the yarn into the precipitation bath and the anti-solvent diffuses from the bath into the yarn. In solution-spinning, such as for example described in PCT2012EP59114, a drying step of the infusible precursor yarn is needed to perform the structural collapse of the never-dried yarn. The application of a spin finish is necessary for the subsequent processing steps such as winding, unwinding or thermal conversion to carbon fiber. A layer of spin finish is coated onto the filament surfaces and acts as a protective layer that reduces fiber friction and static electricity. In this way, filament breakages are reduced in the subsequent process steps and this greatly improves processability. Spin finishes also improve the mechanical properties of the final yarn due to lower extent of filament breakages. In the production of precursor fibers for carbon fiber the amount of spin finish should be kept at a minimum because the layer of spin finish inhibits diffusion of volatile components from the precursor to the surroundings during thermal conversion of the precursor to carbon fiber. Too slow diffusion may lead to the formation of voids in the fiber, i.e. defects and also slows down the conversion kinetics, i.e. increases process costs. Spin finishes for cellulose based man-made fibers and carbon fiber precursors are water-based emulsions and have limited use for lignin-containing filament yarns because water acts as a softener for lignin [5-7]. This promotes filament stickiness during the drying step. The sticking of filaments should be avoided because it causes surface defects and unequal diffusion during thermal conversion to carbon fiber leading to poor mechanical performance. During thermal conversion of lignin-containing precursors to carbon fiber filament, stickiness has been reported. The reasons for the adhesion problems are not explained but they most likely are caused by the softening of lignin [8].

Thus, the problem to be solved is to minimize the stickiness of individual filaments for the solution spinning process for the continuous manufacture of lignin containing endless filament yarns.

The solution to this problem is a novel method based on applying a water-free spin finish on the yarn, as set out in the first aspect of the invention. The method described in this invention provides a filament yarn, which, surprisingly, is essentially free of single filament adhesion and stickiness.

No statements have been made in the literature regarding the usage of tailor-made spin finishes to prevent the problems mentioned above related to filament stickiness due to a softening of the lignin.

The problem to be solved, or at least to alleviate, is thus to minimize the stickiness of individual filaments for the solution spinning process for the continuous manufacture of lignin containing endless filament yarns.

The solution to this problem is accordingly a novel method based on applying a water-free spin finish on the yarn which gives a filament yarn that is essentially free of single filament adhesion and stickiness.

SUMMARY OF INVENTION

The present invention thus solves one or more of the above problems, by providing according to a first aspect a method for manufacturing a precursor yarn comprising lignin, comprising the following steps:
 a) providing cellulose and/or a cellulose derivative,
 b) providing lignin and/or a lignin derivative,
 c) dissolution of said components followed by subsequent mixing thus providing a dope,
 d) performing a spinning of the dope to a precursor material,
 e) applying a water-free spin finish on said precursor material, and
 f) drying of said precursor material, thus providing a precursor yarn comprising lignin.

Also provided according to a second aspect of the invention is use of a water-free spin finish for avoiding stickiness and/and or adhesion of single filaments in the manufacturing of a precursor yarn comprising lignin.

Also provided according to a third aspect of the invention is a precursor yarn comprising lignin obtainable by the method according to the first aspect.

Also provided according to a fourth aspect of the invention is a method for manufacturing a stabilized carbon fibre comprising the following steps:
 g) providing a precursor yarn comprising lignin according to the third aspect, and
 h) performing a stabilization, thus providing a stabilized carbon fibre.

Also provided according to a fifth aspect of the invention is a stabilized carbon fibre obtainable by the method according to the fourth aspect.

Also provided according to a sixth aspect is a method according to the fifth aspect comprising the following additional step:
 i) performing a stretch-pre-carbonization, thus providing an intermediate carbon fiber which preferably is highly oriented.

Also provided according to a seventh aspect is an intermediate carbon fiber obtainable by the method according to the sixth aspect.

Also provided according to an eighth aspect is a method for manufacturing a carbon fiber comprising the following steps:
 j) providing a stabilized carbon fibre according to the fifth aspect or an intermediate carbon fiber according to the seventh aspect and
 k) performing a carbonization step, thus providing a carbon fiber.

Also provided according to a ninth aspect is a carbon fibre obtainable by the method according to the eighth aspect.

Also provided according to a tenth aspect is a carbon fiber having an E-Modulus of from about 870 to about 1480 cN/tex, and preferably also a tenacity of from about 16 to about 36.5 cN/tex. Said carbon fibre may be obtained by the method according to the eighth aspect.

Also provided according to an eleventh aspect is use of the carbon fiber according to the ninth or tenth aspect in the manufacture of carbon fiber-reinforced composites for applications such as appliances, automotive parts, wind turbine rotor blades or airplane parts.

DETAILED DESCRIPTION OF THE INVENTION

It is intended throughout the present description that the expression "lignin" embraces any lignin which may be used for making a carbon fiber or precursors thereof. Examples on said lignin are, but are not limited to softwood lignin, hardwood lignin, lignin from one-year plants or lignins obtained through different pulping methods such as, organosolv pulping or kraft pulping. The lignin may e.g. be isolated by using the process disclosed in EP 1794363. The lignin may have its origin in any biomass feedstock. The feedstock may e.g. be bagasse, as well as eucalyptus and pine. The lignin may also be of high purity: ash <1000 ppm, carbohydrate <1000 ppm, very low sulfur, low volatiles and low on particles. The lignin may also be obtained through a process of Virdia as e.g. set out in WO2014179777. The term "lignin" also encompasses native lignin in biomass and lignin derivates.

It is intended throughout the present description that the expression "cellulose" embraces any type of cellulose, such as cellulose fibers and cellulose materials. The cellulose may also be a microfibrillated cellulose (MFC). The cellulose may be bleached or unbleached. The cellulose may also be crystalline cellulose, MCC (microcrystalline cellulose); it may have a high purity due to its potential use in pharmaceutical compositions or other medical uses. The cellulose may be bacterial nanocellulose (BNC) or nanocrystalline cellulose (NCC); it may be used in electrical applications and have magnetical properties. The cellulose may be man-made synthetic polymer fibers and fibers made from dissolving pulp. The cellulose may have its origin from of a pulp, which may be chemical pulp, mechanical pulp, thermomechanical pulp or chemi(thermo)mechanical pulp (CMP or CTMP). The pulp may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, Kraft and soda pulps, and mixtures of these. The pulp may be a dissolving pulp. The pulp may also comprise textile fibers. The pulp may also be based on one-year plants (e.g. bagasse, bamboo, switchgrass). The pulp may also be nanopulp comprised of nanocellulose fibers. Also combinations of said pulp types are possible in the context of the present invention. The pulp may also contain synthetic fibers or biofibers such as PLA (Poly-lactic acid). Said cellulose may be converted into a cellulose derivative. It is intended throughout the present description that the expression "cellulose derivate" embraces any type of fiber-forming cellulose derivate, in particular 1) cellulose carbamate, 2) cellulose ethers with low degree of substitution, in particular methyl (CMC) or ethyl cellulose (with substitution degree <0.2) also hydroxyl ethyl cellulose and hydroxyl propyl cellulose with molecular substitution of lower that 0.3, 3) cellulose allophanate and hemicellulose and/or mixtures thereof.

According to a further preferred embodiment of the first aspect of the invention the spinning in step d) is performed through a solution spinning or wet-spinning, preferably through air-gap spinning or dry jet-wet spinning. Said techniques are techniques known to a person skilled in the art.

According to a further preferred embodiment of the first aspect of the invention the application in step e) is performed by using a bath, oiler stone or dip roller or a combination thereof.

According to a further preferred embodiment of the first aspect of the invention the water-free spin finish in step e) comprises at least one organic solvent with a boiling point lower than 130° C., preferably selected from the group of protic polar solvents and/or the group of aprotic polar solvents.

According to a further preferred embodiment of the first aspect of the invention the water-free spin finish in step e) comprises one or more aprotic polar solvents with a dipole moment in the range of from $5 \times 10^{-30}$ Cm to $10 \times 10^{-30}$ Cm, such as acetone or ethyl acetate, and/or one or more protic polar solvents with a dipole moment in the range of from $5 \times 10^{-30}$ Cm to $8 \times 10^{-30}$ Cm, such as ethanol, propanol and iso-propanol.

According to a further preferred embodiment of the first aspect of the invention the protic polar solvent has a structure as shown below, wherein at least one of R1, R2 and R3 always is a hydroxyl group, and R1, R2 and R3 are as follows:

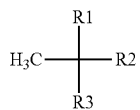

R1 = H, CH$_3$, (CH$_2$)$_n$, OH; n = 1-2
R2 = H, CH$_3$, (CH$_2$)$_n$, OH; n = 1-4
R3 = H, CH$_3$, (CH$_2$)$_n$, OH; n = 1-2

According to a further preferred embodiment of the first aspect of the invention the aprotic polar solvent is selected from the groups of ketoalkyl or ketoalkoxy compounds, or alternatively is comprised of cyclic structures of 5- and 6-rings containing heteroatoms as set out below and have a structure as shown below, wherein R1, R2, R3 and R4, and W, X, Y, Z are as follows:

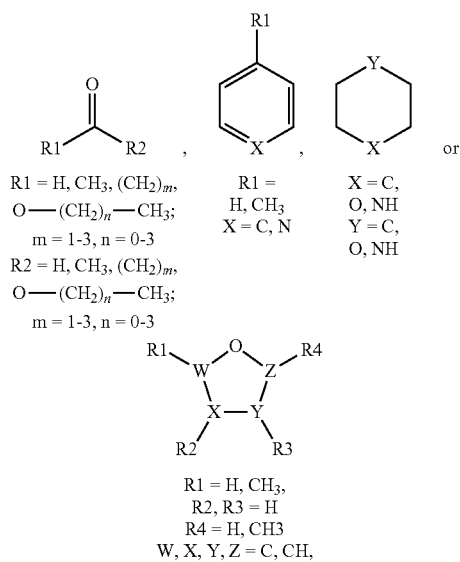

According to a further preferred embodiment of the first aspect of the invention the water-free spin finish additionally contains one or more additives, such as one or more antistatic agents and/or one or more anti-friction agents.

According to a further preferred embodiment of the first aspect of the invention the water-free spin finish additionally is mixed with a water-containing spin finish within the range of from 1:10 to 10:1, preferably from 1:5 to 5:1 and most preferred 1:1.

According to a further preferred embodiment of the first aspect of the invention the temperature which is applied during the drying step f) does not exceed 150° C.

According to a further preferred embodiment of the first aspect of the invention the water-free spin finish is applied before drying, after drying or before and after drying.

According to a further preferred embodiment of the fourth aspect of the invention the stabilization is performed at a temperature from about 100 to about 450° C., preferably from about 200 to about 300° C., most preferred from about 220 to about 280° C. wherein the stabilization is done at a residence time of from 10 to 180 minutes, preferably from 20 to 80 minutes.

According to a further preferred embodiment of the sixth aspect of the invention the stretch-pre-carbonization is realized by stretching the stabilized fiber up to 10-fold at a temperature below 1300° C., preferably below 1100° C., most preferred below 1000° C.

According to a further preferred embodiment of the eighth aspect of the invention the carbonization is performed at a temperature from 900 to 2000° C., preferably from 1200 to 1800° C., most preferred in an inert gas such as nitrogen.

In WO2012156441A1 a method for the production of lignin-containing precursor fibers and also carbon fibers based on the raw materials cellulose and lignin is described. Both components are dissolved together in an appropriate dissolving media to form the dope. The dope is then transferred through a spinning nozzle so that filaments are being formed. In air-gap spinning the nozzle is placed a few centimeters above the precipitation bath. The filament yarn is then fed into a precipitation bath containing deionized water as non-solvent to give lignin-containing precursor fibers.

In the following steps the endless filaments are washed intensively to remove residues of the solvent and dried to perform the structural collapse of the never-dried fiber. High lignin content in the precursor is preferred for cost efficiency because lignin is a cost-competitive raw material. However, increasing the lignin content in the precursor fiber may lead to a high degree of filament adhesion during the drying step. Those filaments can hardly be separated, which causes surface defects and therewith flaws. The resulting carbon fiber exhibits low mechanical performance due to the problems caused by the stickiness, such as unequal diffusion of volatiles during thermal conversion and unequal stretching.

As described earlier, the reason for the adhesion of the single precursor filaments may be owed to the softening of lignin inside the filaments that is promoted by the presence of water. After the washing sequence the precursor yarn contains up to 200% water. During the drying of this yarn, even under mild conditions (the temperature of the drying rollers was set at 80-100° C.) fiber stickiness can be observed. By applying heat for drying of the swollen precursor filament yarn the structure of the single filaments collapses and they start to shrink in diameter causing the surfaces of filaments to get closer to each other. The softened lignin in the filaments promotes the stickiness of the fibers and causes strong and irreversible fiber adhesion.

No statement regarding spin finish has been made in the literature previously to prevent the problems mentioned above related to filament stickiness in solvent spinning due to a water-induced softening of the lignin during drying. The present invention describes a method to reduce the extent of filament stickiness in the continuous manufacture of lignin containing endless filament precursor yarns. The method is based on removing water as much as possible from the never-dried lignin-containing filament by substituting water with a liquid that has a lower boiling point than that of water or that results in an azeotropic mixture with water. This allows the use of low temperature during the manufacture of the precursor filament yarn (precursor yarn). Surprisingly, filament stickiness is essentially eliminated and further processing significantly improved resulting in an endless filament precursor yarn where single filaments are separated. Surprisingly, the treatment of said precursor yarn manufactured according to the first aspect of the present invention, followed by subsequent thermal conversion to carbon fiber results in significantly better mechanical properties of the carbon fiber.

Preferred features of each aspect of the invention are as for each of the other aspects mutatis mutandis. The prior art document(s) mentioned herein are incorporated to the fullest extent permitted by law. The invention is further described in the following examples, together with the appended figure, which do not limit the scope of the invention in any way. Embodiments of the present invention are described as mentioned in more detail with the aid of examples of embodiments, together with the appended figure, the only purpose of which is to illustrate the invention and are in no way intended to limit its extent.

FIGURE

FIG. 1 discloses SEM-images of the surface of lignin containing precursors.

Left: Surface defect of lignin containing precursor treated with a commercial spin finish (example 1). The defects were caused by stickiness followed by mechanical disruption during winding Middle: Perfect surface of single lignin-containing precursor filament that was treated by applying acetone as spinning oil (example 2)

Right: A SEM image displaying a multifilament bundle of lignin-containing filaments from example 2 that clearly shows complete separation of the individual filaments.

EXAMPLES

Example 1

An endless, continuous yarn consisting of 70 filaments and comprised of cellulose and lignin was produced according to the method described in patent publication WO2012156441A1. Specifically, 7.7% wt cellulose and 11.6% wt lignin were mixed with N-methylmorpholine-N-oxide hydrate and heated at 90° C. at 50 mbar until a NMMO content of at least 87% was attained and the dope was formed. In an air-gap spinning apparatus the dope was transferred to the spinning pump by a single screw-extruder. The throughput and drawing from the nozzle were adjusted so that total fineness of the final single-filament was 7-8 dtex. The dope was spun using a nozzle having 70 holes with diameters of 0.15 mm. A 40 mm air gap was realized between the nozzle and the coagulation bath. A constant air flow in the air gap was supplied to discharged dope. The multifilament was coagulated in the coagulation bath and passed through a washing bath filled with hot water followed by washing with distilled water using three Nelson Type rollers. The precursor was then treated with Stoko MW, a commercial spin finish for man-made cellulosic fibers from the company Stockhausen & Co. The spin finish was applied onto the yarn by an oiler stone. The amount spinning oil was set to be 35 $cm^3$/min by a gear pump. The coated precursor was then dried at 80° C. in a 2-stage drying roll to obtain lignin-cellulose containing precursors. The resulting endless filament yarn contained a large number of junctions where single filaments stick together. In the following winding process those filament-filament junctions are disrupted causing fiber breakages (FIG. 1, left).

Example 2

An endless precursor yarn with 70 filaments was manufactured analogously to the method described in example 1 with the exception that prior to the drying stage the yarn was treated with acetone as spin finish instead of Stoko MW. All other processing steps were similar to those described in example 1. Surprisingly, this treatment resulted in an endless filament yarn, free of single filament adhesion, that could be wound and unwound with no fiber breakages (FIG. 1, middle and right). 3) The multi-filament lignin containing precursor yarns from examples 1 and 2 were converted into carbon fibers by applying a stabilization regime up to 250° C. by a heating rate of 50° C./min for a total time of 90 min followed by the carbonization which was performed by reaching a final temperature of 1600° C. by a heating rate of 27° C./min.

Surprisingly, the carbon fiber produced from precursor yarn in example 2 exhibited significantly better mechanical properties compared to those of the corresponding carbon fiber produced from precursor yarn in example 1 with 175% higher tenacity and 150% higher E-Modulus.

Example 3

An endless precursor yarn with 70 filaments was manufactured analogously to the method described in example 1 with the exception that prior to the drying stage the yarn was treated with ethyl acetate as spin finish instead of Stoko MW. All other processing steps were similar to those described in example 1.

Surprisingly, this treatment resulted in an endless filament yarn, nearly free of single filament adhesion, which could be wound and unwound with almost no fiber breakages. The multi-filament lignin containing precursor yarns from examples 1 and 3 were converted into carbon fibers by applying a stabilization regime up to 250° C. by a heating rate of 50° C./min for a total time of 90 min followed by the carbonization which was performed by reaching a final temperature of 1600° C. by a heating rate of 27° C./min.

Surprisingly, the carbon fiber produced from precursor yarn in example 3 exhibited significantly better mechanical properties compared to those of the corresponding carbon fiber produced from precursor yarn in example 1 with 225% higher tenacity (36.5 cN/tex) and 170% higher E-Modulus (1480 cN/tex).

Example 4 (Additional Example)

An endless precursor yarn with 70 filaments was manufactured analogously to the method described in example 1 with the exception that prior to the drying stage the yarn was treated with ethanol as spin finish instead of Stoko MW. All other processing steps were similar to those described in example 1.

This treatment resulted in an endless filament yarn, with an increased number of single filament adhesion, which could hardly be wound and unwound with significant number of fiber breakages. The multi-filament lignin containing precursor yarns from examples 1 and 4 were converted into carbon fibers by applying a stabilization regime up to 250° C. by a heating rate of 50° C./min for a total time of 90 min followed by the carbonization which was performed by reaching a final temperature of 1600° C. by a heating rate of 27° C./min.

The carbon fiber produced from precursor yarn in example 4 exhibited significantly lower mechanical properties compared to those of the corresponding carbon fiber produced from precursor yarn in example 1 with 60% less tenacity and 20% lower E-Modulus (6.5 cN/tex and 700 cN/tex, respectively).

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods may be combined with other known methods. Other aspects, advantages and modifications within the scope of the invention will be apparent to those skilled in the art to which the invention pertains.

REFERENCES

[1] Kadla, J. F., et al. Carbon 40 (15), 2002, p. 2913-2920
[2] Kubo Y., et al., Carbon 36 (7-8), 1998, p. 1119-1124
[3] Sudo K., Shimizu K., J. Appl. Polymer Sci. 44 (1), 1992, p. 127-134
[4] Uraki, Y. et al., Holzforschung 49 (4), 1995, p.343-350
[5] F. E. Brauns and D. A. Brauns, The Chemistry of Lignin, Supplement Volume, Academic Press, New York, 1960, p. 173; D. A. I. Goring, in Lignins, K. V. Sarkanen and C. H. Ludwig, Eds., Interscience, New York, 1971, p. 695.
[6] P. R. Gupta, A. Rezanowich, and D. A. I. Goring, Pulp Paper Mag. Can., 63, T-21 (1962).
[7] D. A. I. Goring, Pulp Paper Mag. Can., 64, T-517 (1963).
[8] G. Husman, "Development and Commercialization of a Novel Low-Cost Carbon Fiber," Zoltek, http://energy.gov/sites/prod/files/2014/07/f17/llm048_busman_2014_ o.pdf, 2014

The invention claimed is:

1. A method for manufacturing a precursor yarn comprising lignin, comprising:
   a) providing cellulose and/or a cellulose derivative,
   b) providing lignin and/or a lignin derivative,
   c) dissolution of the cellulose and/or the cellulose derivative and the lignin and/or the lignin derivative in a solvent followed by subsequent mixing thus providing a dope consisting essentially of the cellulose and/or the cellulose derivative and the lignin and/or the lignin derivative and the solvent,
   d) performing a spinning of the dope to a precursor material,
   e) applying a water-free spin finish on said precursor material, and
   f) drying of said precursor material, thus providing a precursor yarn comprising lignin,
   wherein the water-free spin finish in step e) consists essentially of at least one organic solvent with a boiling point lower than that of water, and one or more anti-static agents or one or more anti-friction agents or both, wherein the at least one organic solvent consists essentially of one or more aprotic polar solvent selected from ketoalkyl or ketoalkoxy compounds and has the structure shown below,

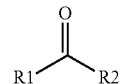

and wherein
R1=H, CH$_3$, O-(CH$_2$)$_n$-CH$_3$; n=0-3,
R2=H, CH$_3$, O-(CH$_2$)$_n$-CH$_3$; n=0-3, and
optionally one or more protic polar solvent, and wherein the water-free spin finish is applied on said precursor material before drying of said precursor material.

2. A method according to claim 1 wherein the spinning in step d) is performed through a solution spinning or wet-spinning.

3. A method according to claim 1 wherein the application in step e) is performed by using a bath, oiler stone or dip roller or a combination thereof.

4. A method according to claim 1 wherein the one or more aprotic polar solvent has a dipole moment in the range of from $5 \times 10^{-30}$ Cm to $10 \times 10^{-30}$ Cm.

5. A method according to claim 1 wherein the water-free spin finish contains the one or more anti-static agents.

6. A method according to claim 1 wherein the water-free spin finish additionally is mixed with a water-containing spin finish within the range of from 1:10 to 10:1.

7. A method according to claim 1 wherein the temperature which is applied during the drying step f) does not exceed 150° C.

8. A method according to claim 1 wherein the spinning in step d) is performed through air-gap spinning or dry jet-wet spinning.

9. A method according to claim 1 wherein the water-free spin finish contains the one or more anti-friction agents.

10. A method according to claim 1 wherein the water-free spin finish additionally is mixed with a water-containing spin finish within the range of from 1:5 to 5:1.

11. A method according to claim 1 wherein the water-free spin finish additionally is mixed with a water-containing spin finish within the range of 1:1.

12. A method for manufacturing a precursor yarn comprising lignin, comprising:
   a) providing cellulose and/or a cellulose derivative,
   b) providing lignin and/or a lignin derivative,
   c) dissolution of the cellulose and/or the cellulose derivative and the lignin and/or the lignin derivative in a solvent followed by subsequent mixing thus providing a dope consisting essentially of the cellulose and/or the cellulose derivative and the lignin and/or the lignin derivative and the solvent,
   d) performing a spinning of the dope to a precursor material,
   e) applying a water-free spin finish on said precursor material,
   f) drying of said precursor material, thus providing a precursor yarn comprising lignin, and
   g) performing a stabilization on the precursor yarn to produce a stabilized carbon fibre,
   wherein the water-free spin finish in step e) consists essentially of at least one organic solvent with a boiling point lower than that of water, and one or more anti-static agentsor one or more anti-friction agents or both, wherein the at least one organic solvent consists essentially of an aprotic polar solvent selected from ketoalkyl or ketoalkoxy compounds and has the structure shown below,

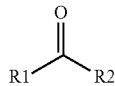

and wherein
$R_1$=H, $CH_3$, O-$(CH_2)_n$-$CH_3$; n=0-3,
$R_2$=H, $CH_3$, O-$(CH_2)_n$-$CH_3$; n=0-3, and
wherein the water-free spin finish is applied on said precursor material before drying of said precursor material.

13. A method according to claim 12 wherein the stabilization is performed at a temperature from about 100 to about 450° C., wherein the stabilization is done at a residence time of from 10 to 180 minutes.

14. A method according to claim 12 further comprising:
   h) performing a stretch-pre-carbonization on the stabilized carbon fiber to produce a highly oriented intermediate carbon fiber.

15. The method according to claim 14 wherein the stretch-pre-carbonization is realized by stretching the stabilized fiber up to 10-fold at a temperature below 1300° C.

16. The method according to claim 14 wherein the stretch-pre-carbonization is realized by stretching the stabilized fiber up to 10-fold at a temperature below 1100° C.

17. The method according to claim 14 wherein the stretch-pre-carbonization is realized by stretching the stabilized fiber up to 10-fold at a temperature below 1000° C.

18. A method according to claim 14 further comprising the following steps:
   i) performing a carbonization step on the intermediate carbon fiber, thus providing a carbon fiber.

19. A method according to claim 12 further comprising:
   i) performing a carbonization step on the stabilized carbon fibre, thus providing a carbon fiber.

20. A method according to claim 19 wherein the carbonization is performed at a temperature from 900 to 2000° C., in an inert gas.

21. A method according to claim 19 wherein the carbonization is performed at a temperature from 1200 to 1800°° C. in an inert gas.

22. A method according to claim 12 wherein the one or more aprotic polar solvent has a dipole moment in the range of from $5\times10^{-30}$ Cm to $10\times10^{-30}$ Cm.

23. A method according to claim 12 wherein the stabilization is performed at a temperature from about 200 to about 300° C., wherein the stabilization is done at a residence time of from 10 to 180 minutes.

24. A method according to claim 12 wherein the stabilization is performed at a temperature from about 220 to about 280° C. wherein the stabilization is done at a residence time of from 10 to 180 minutes.

25. A method according to claim 12 wherein the stabilization is performed at a temperature from about 100 to about 450° C., wherein the stabilization is done at a residence time of from 20 to 80 minutes.

26. A method according to claim 12 wherein the stabilization is performed at a temperature from about 200 to about 300° C., wherein the stabilization is done at a residence time of from 20 to 80 minutes.

27. A method according to claim 12 wherein the stabilization is performed at a temperature from about 220 to about 280° C. wherein the stabilization is done at a residence time of from 20 to 80 minutes.

* * * * *